Feb. 20, 1923.

E. A. JOHNSTON ET AL 1,446,121

TRACTOR

Filed Aug. 25, 1917

Inventors.
Edward A. Johnston
Gustaf W. Engstrom,
by Chas. E. Lord
Atty.

Feb. 20, 1923.

E. A. JOHNSTON ET AL

TRACTOR

Filed Aug. 25, 1917

Inventors:
Edward A. Johnston
and Gustaf W. Engstrom,
by Chas. E. Lord
Atty.

Inventors:
Edward A. Johnston
and Gustaf W. Engstrom,
by Chas. E. Lord
Atty.

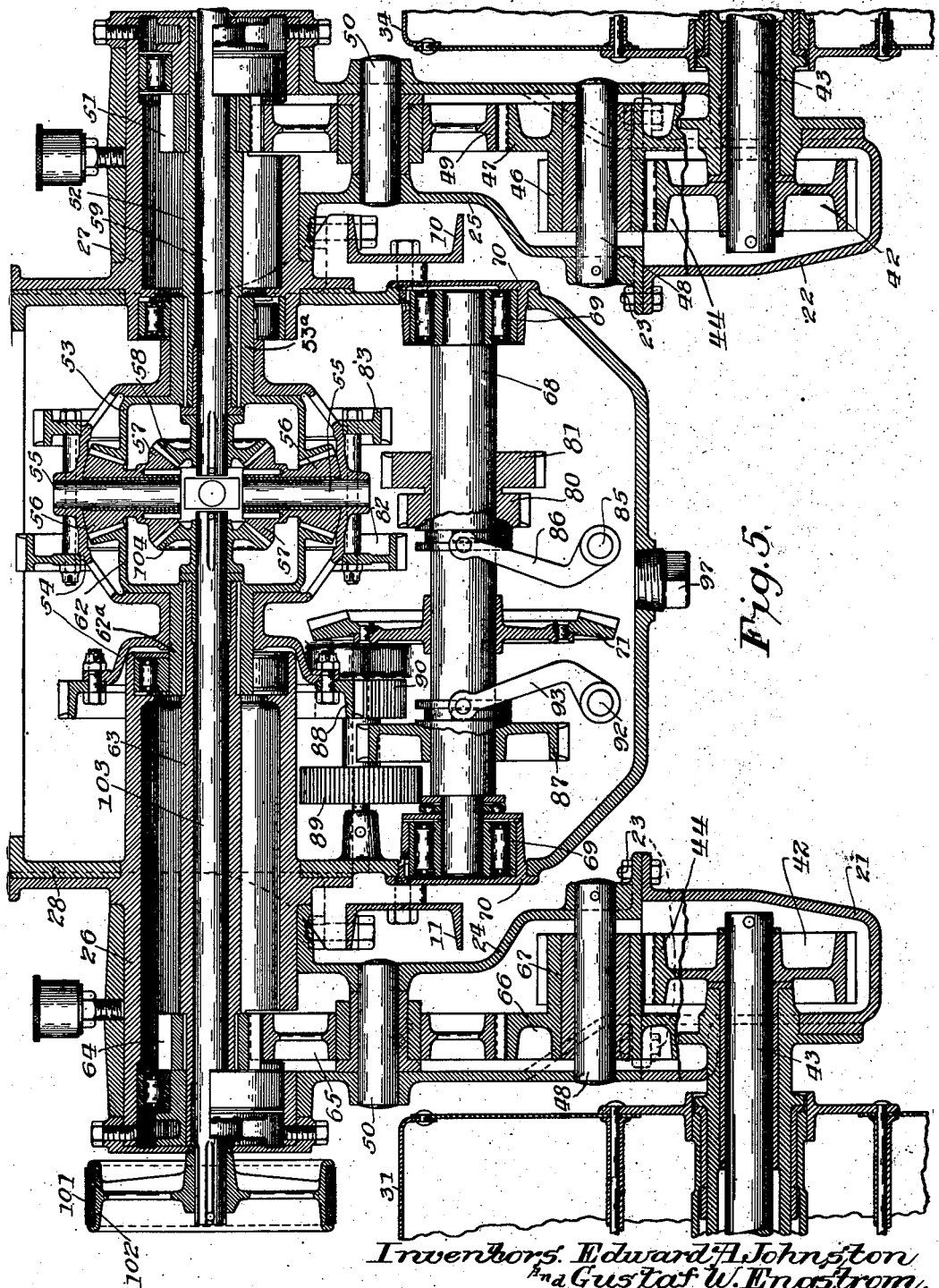

Patented Feb. 20, 1923.

1,446,121

UNITED STATES PATENT OFFICE.

EDWARD A. JOHNSTON AND GUSTAF W. ENGSTROM, OF CHICAGO, ILLINOIS, ASSIGNORS, BY MESNE ASSIGNMENTS, TO INTERNATIONAL HARVESTER COMPANY, A CORPORATION OF NEW JERSEY.

TRACTOR.

Application filed August 25, 1917. Serial No. 188,210.

*To all whom it may concern:*

Be it known that we, EDWARD A. JOHNSTON and GUSTAF W. ENGSTROM, citizens of the United States, and residents, respectively, of Chicago, in the county of Cook and State of Illinois, and of Chicago, in the county of Cook and State of Illinois, have invented certain new and useful Improvements in Tractors, of which the following is a full, clear, and exact specification.

This invention relates to tractors.

The ordinary three or four wheel tractor having one or two driving wheels meets the general needs in connection with plowing and other draft loads, but there are conditions which cannot be combated successfully with this type of tractor. For instance, it is not uncommon to see the two rear drive wheels of a two wheel drive tractor bury themselves up to their hubs when driving in sandy soil or in wet, soggy ground. To overcome this particular difficulty occasioned in certain sections of this and other countries, track-laying types of tractors have been built and used. At best, however, the track-laying type of tractor is a complicated piece of machinery having a large number of intricate parts which thus far have given considerable trouble to their operators. There is a need, therefore, for a simple general purpose tractor which also is capable of effective work, especially in sandy, loose, or muddy ground.

One object, therefore, of this invention is to facilitate plowing and other draft work, especially under unfavorable conditions, such as sandy, loose, or muddy ground conditions.

Another object of the invention is to provide a tractor having improved driving and general construction features, which is adapted to do effective work under such diverse ground conditions.

Another object is to simplify and control in a novel manner the movements of a tractor, having as few parts as possible and arranging the same compactly to meet the various requirements for successful commercial operation.

These and other objects are accomplished by providing a simple, compact tractor having all of its wheels positively driven and arranged to be effectively controlled for steering purposes.

The invention is illustrated on the accompanying sheets of drawings, in which

Figure 5 is a detail sectional view, on an enlarged scale, taken in the plane of the broken line 5—5 of Figure 1, looking in the direction of the arrow and showing in general the power and speed transmission system.

Figure 1:
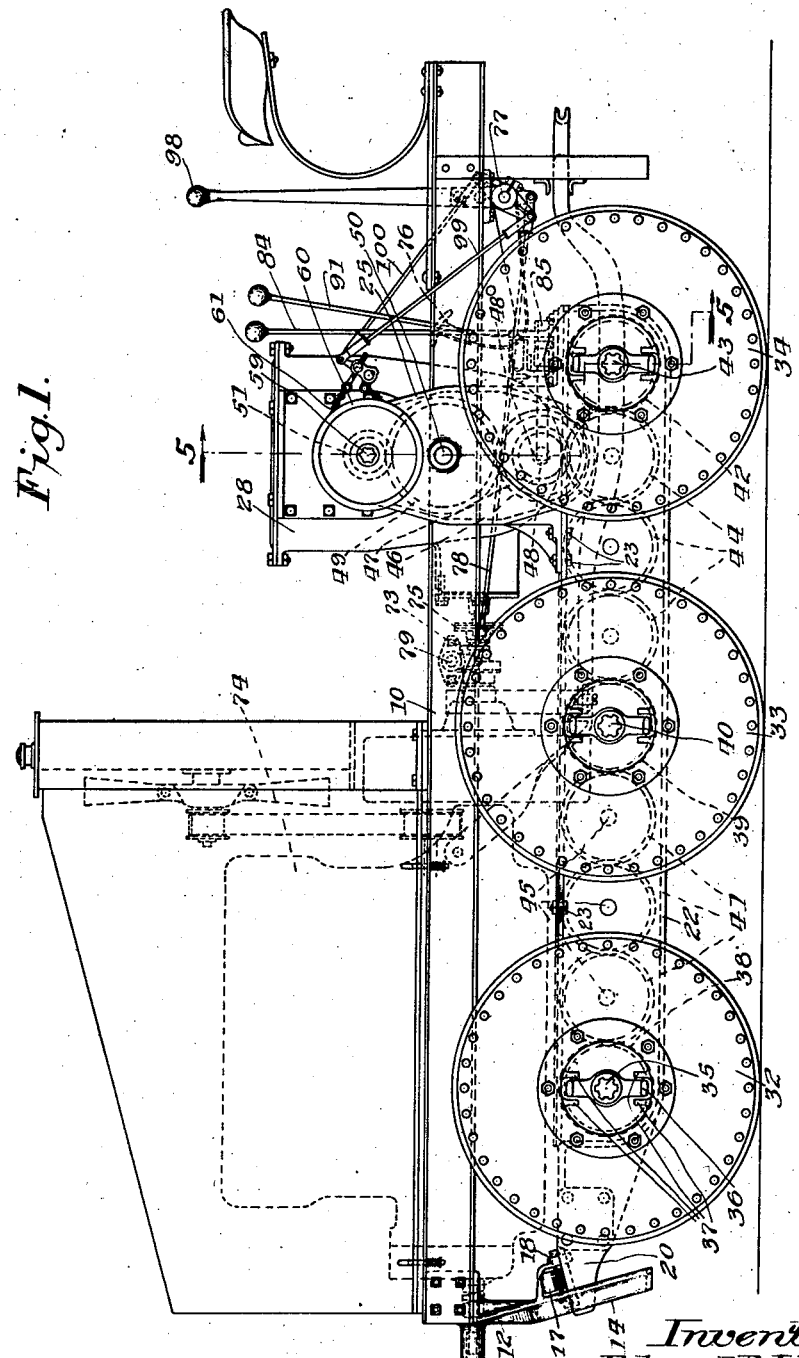
Figure 1 is a side elevation of our tractor.

The various novel features of our invention will be apparent from the following specification and drawings and will be particularly pointed out in the appended claims.

Our tractor includes a main frame having left and right-hand side members 10 and 11 which are connected at their front ends by a bolster 12 having depending arms 13 and 14 on opposite sides, which arms are provided with elongated guiding slots 15 and 16, respectively. An equalizing bar 17 is pivotally mounted at 18 to the bolster 12 and extends laterally in opposite directions, the opposite ends of which equalizing bar rest upon forwardly extending members 19 and 20 which are adapted to move vertically in the slots 15 and 16, respectively. By referring to Figures 1 and 2, it will be seen that the members 19 and 20 are respectively connected to the front ends of casings 21 and 22, which extend rearwardly of the tractor below the side frame members (see Figures 1, 4 and 5) and are connected by suitable bolts 23 to hollow depending hanger arms 24 and 25, respectively, which are respectively pivotally hung on laterally and oppositely extending trunnion members 26 and 27 (see Figure 5), which are fitted into or form a portion of the transmission casing 28, which is secured to and supported by the side frame members 10 and 11 and which is provided with a removable plug 97 whereby the casing may be drained of its oil. From this arrangement it is apparent that each of the casings 21 and 22 is independently mounted for pivotal or hinging movements about the trunnion members 26 and 27, and together with the members 19 and 20 constitute supplemental frames.

Operatively connected to the casing 21 are three drive wheels 29, 30 and 31, and likewise operatively connected to the other casing 22 are three drive wheels 32, 33 and 34. In view of the fact that the driving connections for each set of the wheels are the same on both sides, one side only will be described, this being the left side of the machine. Secured to one end of the shaft of the drive wheel 32 is a cross key 36 (see Figures 1 and 2) which fits between pairs of lugs 37 for transmitting rotary movement to the wheel 32. The driving connection between each driving shaft and its corresponding wheel is the same. Secured to the other end of the driving shaft 35 for the left front wheel 32 is a gear 38, and in the same way gears 39 and 42 are secured to the drive wheels 33 and 34. The drive wheels 32 and 33 are operatively connected by a train of three intermediate gears 41, while the wheels 33 and 34 are connected by three intermediate gears 44. The driven gears 38, 39 and 42 and the intermediate gears 41 and 44 are enclosed in the casing 22, the intermediate gears being supported on studs 45 carried by the gear casing 22.

Figure 2:
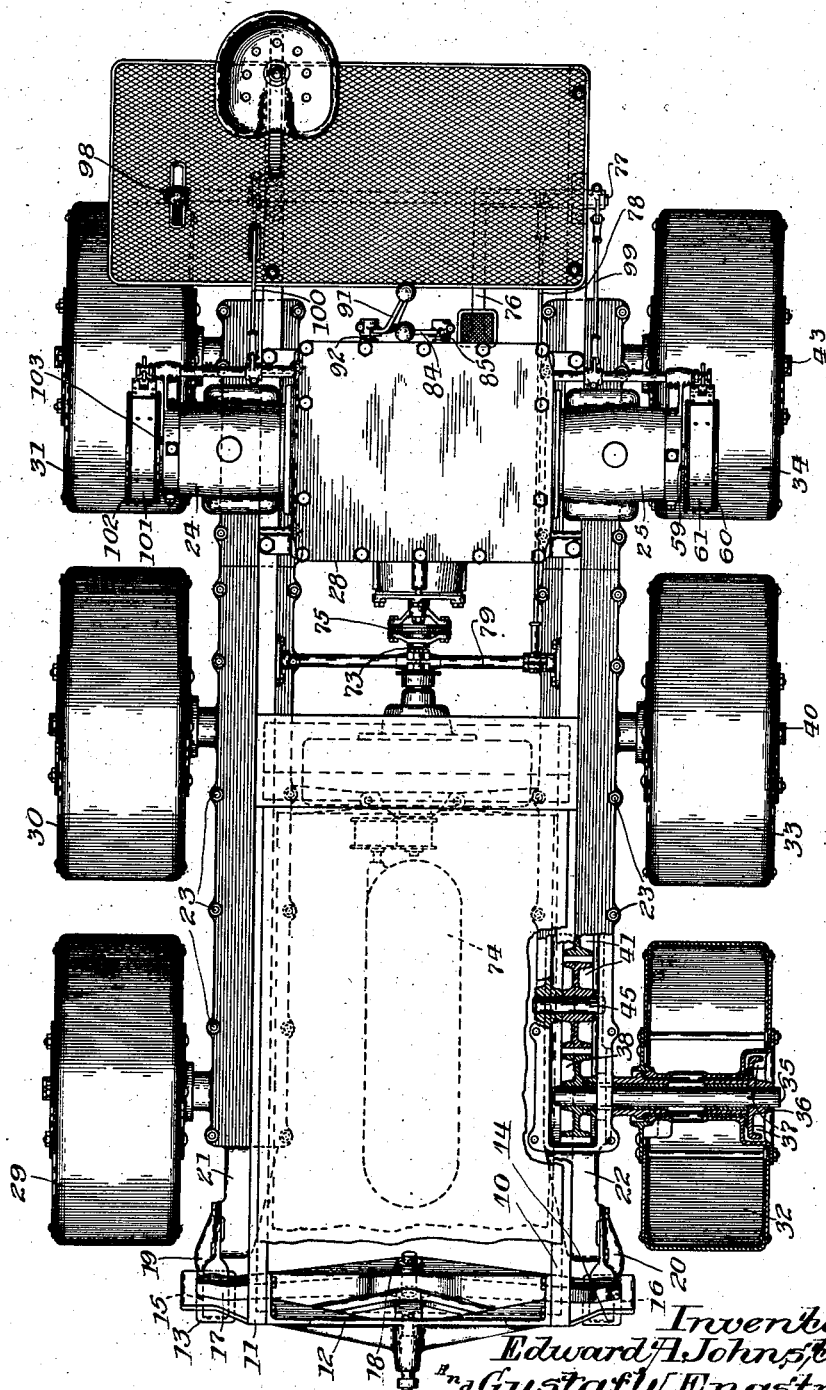
Figure 2 is a top plan view of the same.
Figure 3:
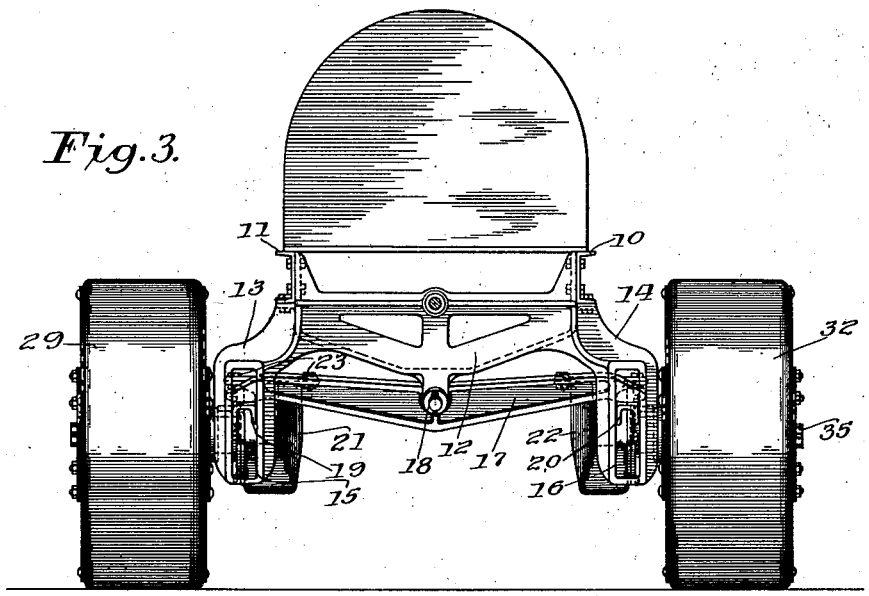
Figure 3 is a front elevation of the tractor.

Referring to Figures 1 and 5, it will be seen that the gear 42 is driven by the intermediate gear 44, which in turn is driven by the gear 46 shown integral with the gear 47 and both mounted on roller bearings on the spindle 48 carried by the hanger arm 25. The gear 47 is driven by the gear 49 mounted on a roller bearing on the shaft 50, which is also carried by the hanger arm 25. The gear 49 is driven by the gear 51, which is keyed on the sleeve or driving shaft 52, and on the other end of the sleeve is keyed a beveled gear 53 forming a part of a differential gear mechanism enclosed by a housing 54. The housing is rotatably mounted on the extended hub 53ª of the gear 53 and carries a plurality of studs or short shafts 55, upon each of which is mounted a beveled gear 56 meshing with the beveled gear 53. A beveled gear 57 formed integrally with the beveled gear 56 meshes with a beveled gear 58 keyed to one end of a shaft 59 which extends transversely with respect to the transmission casing 28 and through the hollow shaft 52. To the outer end of the shaft 59 is secured a brake wheel 60 (see Figure 2), cooperating with which is a brake band 61 to be referred to hereinafter. The beveled gears 56 of the differential mechanism also mesh with a beveled gear 62, having an elongated hub 62ª on which the differential casing is journaled. The hub 62ª is keyed to a hollow driving shaft 63 which transmits a driving motion through gears 64, 65, 66, 67, 44 and 42 to the rear right-hand driving wheel 31, there being other driving connections for the other right-hand driving wheels 29 and 30, as described in connection with the driving wheels on the left-hand side of the machine.

Below the differential gearing there is mounted a cross shaft 68 journaled in bearings 69 carried by caps 70 laterally removable from the transmission casing 28. Secured to the central part of this cross shaft 68 is a beveled gear 71, which meshes with a beveled gear not shown and which is mounted upon the rear end of a shaft 73 (see Figure 1) extending longitudinally with respect to the tractor and which is operatively connected to the crank shaft of the engine 74 by a clutch 75, which is controlled by a pedal 76 mounted upon a rock shaft 77 at the rear of the tractor, a link 78 being connected to the rock shaft and extending forwardly and connected to another rock shaft 79, which is operatively connected to the clutch 75. When the clutch 75 is thrown in, causing the shaft 73 to rotate with the crank shaft, motion is transmitted to the cross shaft 68.

Slidably mounted upon the cross shaft are integrally formed gears 80 and 81, the former of which is adapted to mesh with a gear 82 secured to the transmission casing 54 and the latter, 81, of which is adapted to mesh with another gear 83 also secured to the differential casing 54. These gears 80 and 81 are rotatable with and shiftable on the shaft 68 to mesh with their respective mating gears by a hand controlled lever 84 (see Figure 4) which is mounted upon a rock shaft 85, to which is secured an arm 86 operatively connected to the gears 80 and 81. Also slidable upon the cross shaft 68 on the opposite side of the gear 71 is a gear 87 which is rotatable with the shaft 68 and slidable thereon, and which is adapted to mesh with a gear 88 also secured to the differential housing 54. This gear 87 is also adapted to mesh with a reverse gear 89, which is operatively connected with a gear 90, which in turn meshes with gear 88. The gear 87 is shifted into engagement with the gears 88 and 89 by a hand controlled lever 91 (see Figure 4), which is secured to a rock shaft 92, to which is secured an arm 93 operatively connected to the gear 87. Assuming that the clutch 75 is thrown in, the tractor may be driven on low speed forward by throwing the hand controlled lever 84 into a position to place gear 80 into mesh with gear 82, whereupon the differential casing 54 will be rotated, causing the transmission of power to the gears 53 and 62 and the oppositely extending sleeves 52 and 63 to the gearing, which connects with the drive wheels on either side of the tractor for driving the tractor by six drive wheels. The tractor will be caused to move at second speed forward if the same hand controlled lever 84 is moved in a direction to cause gear 81 to mesh with its mating gear 83. The tractor will be driven at high speed forward if the other hand controlled lever 91 is shifted to cause gear 87 to move into mesh with its mating gear 88, and if the hand controlled lever 91 is moved into a position to cause gear 87 to mesh with gear 89, the tractor will be caused to take a rearward movement.

Figure 4:
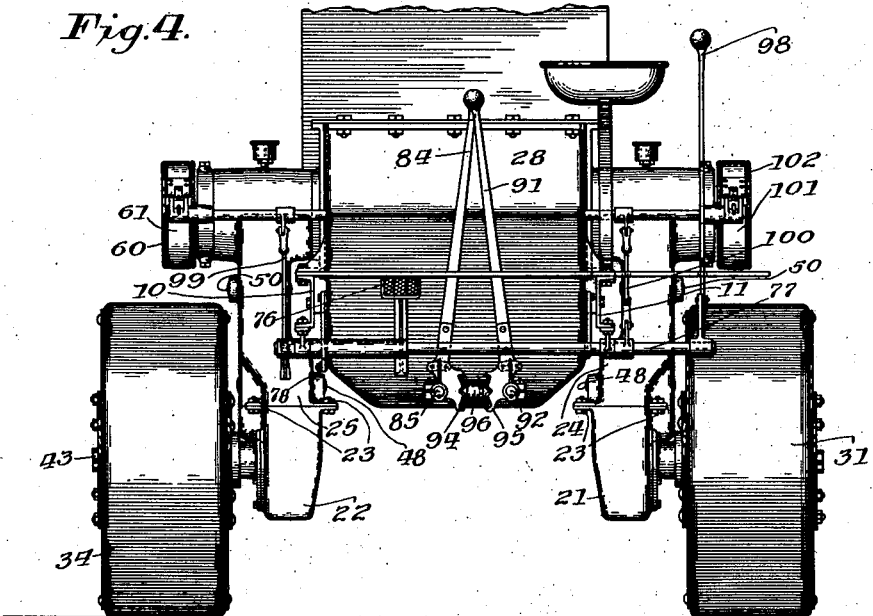
Figure 4 is a fragmentary rear elevation of the same tractor.

Formed between the hand controlled levers 84 and 91 there is an interlock which includes notched members 94 and 95, shown in Figure 4, secured, respectively, to the control levers 84 and 91, which are engaged by an intermediate member 96, having pointed ends which are adapted to pass into the notches or ride on the curved surfaces of the members 94 and 95. The pointed member 96 is in engagement with a notch in the member 94, whereby the control lever 91 is free to move in either direction. As soon as the control lever 91 is moved in either direction from its neutral position, it will be seen that it is impossible to move the control lever 84. Likewise, when the control lever 91 is located in its neutral position, the control lever 84 may be moved in either direction from its neutral position. In this manner it is impossible to cause injury to the gearing by throwing both sets of gears into mesh at the same time.

The steering of the tractor is accomplished by means of a single control lever 98, which is mounted upon one end of the cross shaft 77, which, through suitable connections, including a link 99, is connected to the brake strap 61 surrounding the brake wheel 60 mounted upon the shaft 59. The control lever 98 is also connected through suitable connections, including a link 100, to a brake strap 101 surrounding the brake wheel 102 mounted upon the outer end of shaft 103. It will be noted that the shafts 59 and 103 are connected to gears 58 and 104, respectively, of a differential gearing mechanism which is a differential formed within another differential including the gears 53 and 62. If it is desired to turn the tractor to the right, the control lever 98 is thrown in one direction from the neutral position, whereupon the right-hand brake strap 101 will be forced into engagement with the brake wheel 102, causing the gear 104 to slow up or even to stop, according to the amount of braking action applied. The differential idlers 56, 57 will then revolve, causing the gear 53 to speed up and the gear 62 to slow down.

Owing to the fact that the gear ratio between the gears 56 and 54 is greater than between the gears 57 and 104, the gear 104 never will be stopped altogether. The result is that applying the brake to the brake wheel 102 slows down the right-hand drive wheels 29, 30, 31 and speeds up the drive wheels 32, 33, 34, and the tractor will be turned to the right, the sharpness of the turn depending upon the amount of braking action applied. In like manner when it is desired to turn to the left, a braking action is applied to the brake wheel 60 which causes the drive wheels 32, 33, 34 to slow down and the drive wheels 29, 30, 31 to speed up. The sharpness of the turn will depend upon the amount of the braking action and may be regulated by the operator with great nicety either in forward or reverse movement. A change in the proportion of the gears of the inner and outer differential would allow the drive of one side to be stopped altogether, or even to be reversed. When the hand controlled lever 98 is in neutral position and the clutch 75 is in, power is transmitted to each one of the six drive wheels 29 to 34, inclusive, which wheels present a relatively broad traction surface to the ground and are effective in propelling the tractor over sandy, loose or muddy ground without sinking into the ground and with a minimum loss of power caused by slippage. In this way the tractor is made highly efficient for draft purposes. All six wheels are effective in transmitting power at all times. The tractor is not only operated to advantage in sandy, loose and muddy ground, but also over uneven ground. The wheels are always maintained in engagement with the ground, as each of the gear casings 21 and 22, which carry the drive wheels, is independently and pivotally mounted upon the trunnions 26 and 27, respectively, the front ends of the casings 21 and 22, or, rather, the members 19 and 20, respectively, secured thereto being vertically movable in the elongated guide openings 15 and 16 of the bolster 12 to compensate for uneven ground conditions.

By means of this simple, compact and easily controlled arrangement a tractor which is adapted to meet all the requirements for successful commercial operation is provided.

There may be various modifications of the invention herein disclosed, and it is our intention to cover all such modifications which do not involve a departure from the scope of our invention as set forth in the following claims.

What we claim as new is:

1. In a tractor, the combination of a frame, an engine carried thereby, a plurality of ground engaging wheels carried on each side of said frame and adapted to conform to irregularities in the contour of the ground being traversed, means whereby power may be transmitted from said engine to all the wheels on each side for driving and steering purposes, and means for controlling the transmission of power from said engine to the wheels whereby the wheels on one side may be retarded and those on the other side accelerated to steer the tractor.

2. In a tractor, the combination of a main frame, an engine mounted thereon, supplemental frames pivotally connected at one end to opposite sides of the main frame and vertically movable with respect to the main frame at the other end, a plurality of drive wheels supporting each supplemental frame, a differential having a casing mounted on said main frame, a driving connection between said engine and differential, driving connections between said drive wheels and opposite sides of said differential, brake members operatively connected to opposite sides of said differential, and a control member for applying either of the brake members to cause a transmission of more power to the drive wheels connected to the opposite side of the differential than to the drive wheels connected to the side of the differential on which the brake is applied for the purpose of steering.

3. In a tractor, the combination of a frame, an engine mounted thereon, propelling wheels operatively connected to the frame, two operatively connected differentials mounted concentrically, an operative connection between said engine and one of said differentials, an operative connection between said propelling wheels and the same differential, and steering mechanism operatively connected to the other differential.

4. In a tractor, the combination of a frame, an engine mounted thereon, propelling wheels operatively connected to the frame, two operatively connected differentials mounted concentrically, an operative connection between said engine and one of said differentials, an operative connection between said propelling wheels and the same differential, and means for retarding one side or the other of the other differential to slow up the wheels on the corresponding side of the tractor.

5. In a tractor, the combination of a frame, an engine mounted thereon, propelling wheels operatively connected to the frame, two operatively connected differentials mounted concentrically, an operative connection between said engine and one of said differentials, an operative connection between said propelling wheels and the same differential, and means for manipulating the other differential to cause one side or the other of the first differential to run faster than the other side of the same differential.

6. In a tractor, the combination of a frame, an engine mounted thereon, propelling wheels operatively connected to the frame, two operatively connected differentials one within the other, an operative connection between said engine and one of said differentials, an operative connection between said propelling wheels and the same differential, and steering mechanism operatively connected to the other differential.

7. A tractor comprising a main frame, an engine and a differential casing mounted on the main frame, a differential within a differential carried by the casing, both adapted to be operatively and simultaneously driven by the engine, a tractor frame pivotally mounted on each side of the main frame carrying tractor means, operative connections between the outer differential and the tractor means, and means for controlling the inner differential so as to cause the tractor means of either side to speed up while the other side slows down for the purpose of steering.

8. In a tractor, the combination of a main frame, an engine mounted thereon, supplemental frames pivotally connected at their rear ends to opposite sides of the main frame and vertically movable with respect to the main frame at their forward ends, propelling means supporting each supplemental frame, a differential having a casing mounted on the main frame, a connection between the engine and differential, connections between the propelling means and differential, brake members operatively connected, to the differential, and controlling means for applying either of the brake members to increase the power transmitted to the propelling means on one side and decrease the power transmitted to the other for the purpose of steering.

9. In a tractor, the combination of a differential gearing including a rotatable housing having two opposite bearings, two aligned driving shafts in the respective bearings and connected to the differential gearing, means for rotating the housing, and means including gearing carried by the housing and operatively connected with the differential gearing whereby either driving shaft may be positively turned in its bearing in the same direction as that in which the housing is rotated, but at a greater speed, and whereby the other shaft will be turned in its respective bearing in the same direction but at a lesser speed.

10. In a tractor, the combination of a housing, two aligned driving shafts rotatable in the housing, differential gearing operatively connecting the driving shafts to rotate with the housing, means for rotating the housing, and means including gearing operatively connected with the differential gearing whereby either of the shafts may be rotated forward with respect to the housing, and whereby the other shaft will be rotated backward with respect to the housing.

11. In a tractor, the combination of a differential housing, two oppositely extending driving shafts on which the housing is rotatably mounted, means for rotating the differential housing, differential gearing in the housing for driving the said shafts, and means operable while the housing is rotating to positively rotate one shaft in the housing in the same direction that the housing is rotating and to positively rotate the other shaft in the housing in the opposite direction.

12. In a tractor, the combination of a rotatable differential housing having two opposite bearings, two oppositely extending drive shafts in the respective bearings, means for rotating the differential housing, differential gearing in the housing for driving the said shafts, and means including a second differential and operable while the housing is rotating to positively rotate one shaft in its bearing in the same direction that the housing is rotating and to positively rotate the other shaft in its bearing in the opposite direction.

13. In a device of the class described, the combination of a rotatable differential housing, two driving shafts coaxial therewith, gears on said driving shafts, a short shaft mounted in said housing, a compensating gear carried by said short shaft and meshing with the gears on the driving shafts to transmit motion thereto from the housing, and means including gearing rotatable with the housing for rotating the compensating gear to accelerate the speed of one driving shaft and retard the speed of the other.

14. In a device of the class described, the combination of a rotatable differential housing, a pair of driving shafts rotatably mounted in the housing coaxial therewith, driving gears on the driving shafts within the housing, compensating gears carried by the housing and meshing with the driving gears, and means including gearing rotatable with the housing for rotating the compensating gears in either direction on their own axes, whereby the speed of rotation of one driving shaft may be accelerated and the speed of the other retarded.

15. In a device of the class described, the combination of a rotatable differential housing a pair of driving shafts rotatably mounted in the housing and coaxial therewith, driving gears on the driving shafts within the housing, compensating gears carried by the housing and meshing with the driving gears, a pair of brake drums coaxial with the differential housing and rotatable therewith, and means including separate gearing operatively connecting the brake drums with the compensating gears for rotating the latter on their own axes to vary the relative speeds of the driving shafts.

16. In a device of the class described, the combination of a rotatable housing, two aligned driving shafts coaxial with the housing, differential gearing in the housing operatively connecting the shafts to the housing, means for rotating the housing and shafts, a brake drum concentric with each shaft, a gear connected to each drum, and gearing operatively connecting the drum gears with the differential gearing, whereby the relative speeds of the shafts and housing may be changed.

17. In a device of the class described, the combination of a rotatable differential housing, a pair of driving shafts rotatably mounted in the housing and coaxial therewith, driving gears on the driving shafts within the housing, compensating gears carried by the housing and meshing with the driving gears, a pair of brake drums coaxial with the differential housing and rotatable therewith, a pair of gears connected to the drums, a pair of pinions engaging the drum gears and connected to the compensating gears, whereby when one of the drums is retarded one of the driving shafts will be rotated forward in the housing and the other driving shaft will be rotated backward in the housing.

18. In a device of the class described, the combination of a rotatable differential housing, a pair of driving shafts rotatably mounted in the housing coaxial therewith, driving gears on the driving shafts within the housing, compensating gears carried by the housing and meshing with the driving gears, a pair of brake drums, a pair of brake shafts connected to the drums and extending into the differential housing from opposite sides, and driving gears on the brake shafts within the housing, compensating gears meshing with the brake driving gears and connected to the first named compensating gears, whereby the brake drums will be rotated with the differential housing, and means for retarding either brake drum to vary the relative speeds of the driving shafts.

19. In a tractor, the combination of a main frame, an engine mounted thereon, a pair of supplemental frames pivotally connected at one end to opposite sides of the main frame and vertically movable at the other end, traction means on the supplemental frames, two operatively connected concentric differentials mounted on the main frame, driving connections between the engine and one of the differentials, driving connections between the same differential and the traction means, and steering mechanism connected to the other differential whereby the operation of the first differential may be altered to steer the tractor.

In testimony whereof we affix our signatures, in the presence of two witnesses.

EDWARD A. JOHNSTON.
GUSTAF W. ENGSTROM.

Witnesses:
L. B. RUMSEY,
B. E. HIGGINS.